(12) United States Patent
Ventre

(10) Patent No.: US 12,511,962 B2
(45) Date of Patent: Dec. 30, 2025

(54) SYSTEMS AND METHODS FOR PROVIDING AN EMERGENCY RESPONDER WITH ACCESS TO A SECURE CONTAINER THAT INCLUDES ACCESS NFORMATION FOR A SECURE SITE

(71) Applicant: The S.A.F.E.R. Box Company, LLC, Maineville, OH (US)

(72) Inventor: Douglas Ventre, Maineville, OH (US)

(73) Assignee: The S.A.F.E.R. Box Company, LLC, Maineville, OH (US)

( * ) Notice: Subject to any disclaimer, the term of this patent is extended or adjusted under 35 U.S.C. 154(b) by 253 days.

(21) Appl. No.: 18/366,005

(22) Filed: Aug. 7, 2023

(65) Prior Publication Data

US 2024/0054830 A1    Feb. 15, 2024

Related U.S. Application Data

(60) Provisional application No. 63/397,567, filed on Aug. 12, 2022.

(51) Int. Cl.
*G07C 9/00* (2020.01)
*G06Q 50/26* (2012.01)

(52) U.S. Cl.
CPC ....... *G07C 9/00571* (2013.01); *G06Q 50/265* (2013.01)

(58) Field of Classification Search
None
See application file for complete search history.

(56) References Cited

U.S. PATENT DOCUMENTS 5,451,757 A * 9/1995 Heath, Jr. ............... G07C 9/33
340/5.4
7,852,196 B1 * 12/2010 Adams ................... G06F 21/33
705/73

(Continued)

FOREIGN PATENT DOCUMENTS

WO    WO-2009045213 A1 *    4/2009    ............. G08B 31/00

OTHER PUBLICATIONS

Knox Company, p. 1 Emergency Key Box—Knox Rapid Access System, https://www.knoxbox.com/Home, Copyright 2022, Printed Nov. 6, 2023.

*Primary Examiner* — K. Wong
(74) *Attorney, Agent, or Firm* — Wood Herron & Evans LLP

(57) ABSTRACT

A system for providing an emergency responder with access to a secure site, the system including a secure container, a responder device, and a dispatcher device. The secure container is located in an unsecured place at or near the secure site and includes a locking mechanism for storing access information for the secure site. The responder device is configured to request an access code that unlocks the locking mechanism of the secure container. The dispatcher device is configured to determine whether the emergency responder has authorization to open the secure container. The authorization is determined based on whether authorization information received from the responder device of the emergency responder matches corresponding stored authorization information. The dispatcher device is further configured to provide the access code to the responder device such that the emergency responder is permitted to unlock the secure container to obtain the access information for the secure site.

15 Claims, 6 Drawing Sheets

(56) References Cited

U.S. PATENT DOCUMENTS

| | | | |
|---|---|---|---|
| 9,734,644 B2* | 8/2017 | Samad | H04N 7/186 |
| 10,039,401 B1* | 8/2018 | Romanucci | A47G 29/141 |
| 10,176,655 B2* | 1/2019 | Gullicksen | G07C 9/00571 |
| 11,521,444 B1* | 12/2022 | Badik | G07C 9/00912 |
| 2019/0333304 A1* | 10/2019 | Flynn | G06Q 20/327 |

* cited by examiner

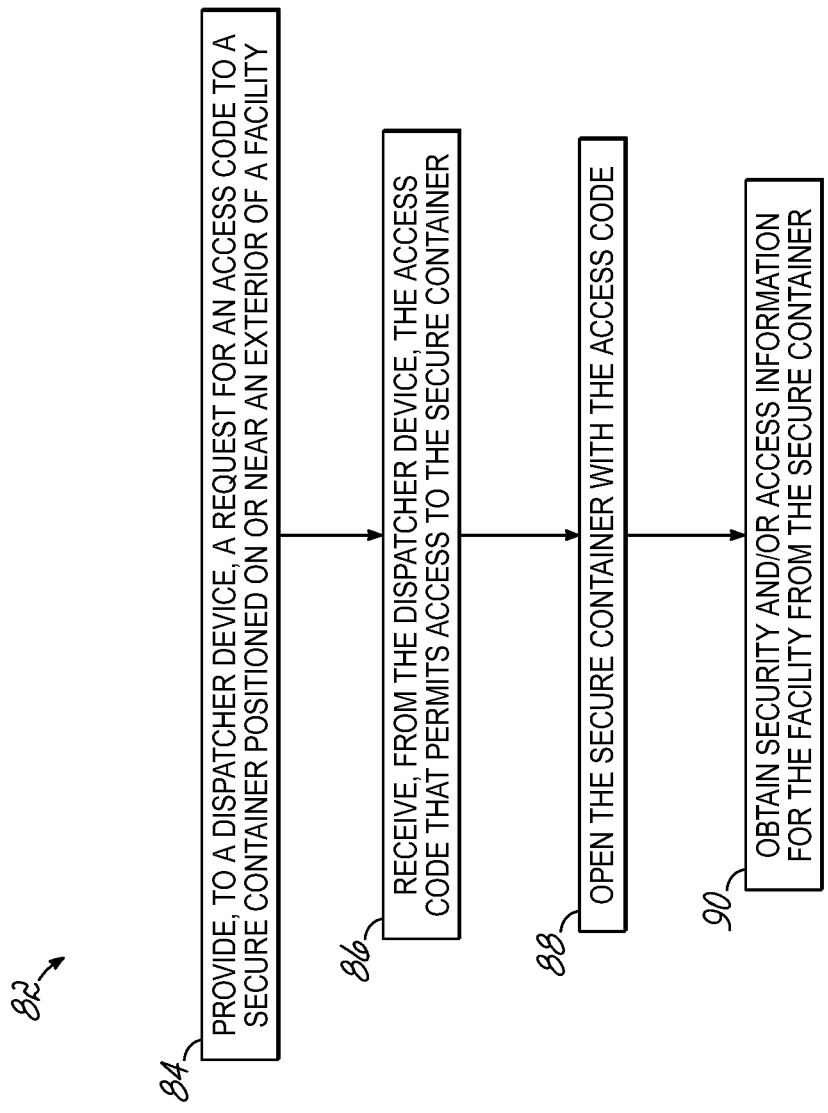

SYSTEMS AND METHODS FOR PROVIDING AN EMERGENCY RESPONDER WITH ACCESS TO A SECURE CONTAINER THAT INCLUDES ACCESS NFORMATION FOR A SECURE SITE

This Application claims the benefit of U.S. Provisional Application 63/397,567 filed on Aug. 12, 2022. The entire contents of these applications are incorporated herein by reference in their entirety.

TECHNICAL FIELD

This invention relates to systems, methods, and/or devices for providing an emergency responder with access to a secure container, where the secure container stores access information for a secure site such that the emergency responder is able to use the access information to enter and navigate within the secure site.

BACKGROUND

A secure site may be a building, enclosure, or area that is capable of restricting access to authorized personnel. Access may be restricted by requiring access information at one or more points of entry. A point of entry may be a door, a gate, and/or a similar type of entry mechanism. The secure site may, for example, be a school, a laboratory, a nuclear power plant, a sports stadium, and/or a similar type of building that provides restricted access. Additionally, or alternatively, the secure site may be an enclosure or open area capable of providing restricted access, such as a Zoo, a botanical garden, an aquarium, a concert venue, and/or the like.

However, in the event of an emergency, safeguards provided by the secure site can prevent or delay entry by emergency responders, such as law enforcement, fire and rescue, emergency medical personnel, and/or the like. A notable example of such a situation is an active shooter situation, such as when a shooter gains access to a school or other building. When this occurs, the building goes into a "lockdown," resulting in restricted access. This can hamper or prevent an emergency responder from entering or accessing the building, or locked rooms inside of it. Furthermore, after an emergency responder gains access to the building, the emergency responder may not have access to a floorplan or site layout, which may be needed to maneuver safely and/or efficiently through the secure site. This causes additional delays for the emergency responder, who may have to navigate blindly through the building.

It is not practical or feasible to provide all emergency responders with a physical key or a code to unlock doors or gates. Physical keys can be lost or stolen, requiring replacement of some or all of the keys. Because of the wide variety of possible emergency response types and the number of personnel in each department, distributing keys to be carried by individual responders is simply not a practical solution.

Some emergency responder teams have the opportunity to engage in on-site training inside the secure site. However, these training sessions are an ineffective long-term solution as not all personnel will have the opportunity to familiarize themselves with the floorplan or site layout of every secure site in their jurisdiction. Furthermore, the first to arrive at the secure site in the event of a crisis often does not have time to wait for others to arrive when lives are at stake. For at least these reasons, it is important to provide emergency responders not only with access to the secure site, but with the floorplan or layout of the secure site.

Accordingly, there is a need for a system that provides emergency responders with access to a secure site in a manner that allows the emergency responders to quickly enter and navigate through the secure site.

SUMMARY OF THE INVENTION

The present invention provides a system and/or method for providing an emergency responder with immediate access to access information for a secure site during a crisis or critical situation.

In an aspect of the invention, a system for providing one or more emergency responders with access to a secure site is disclosed. The system includes a secure container with a locking mechanism for storing access information for the secure site. The secure container is located in an unsecured location at or near the secure site. The system further includes one or more responder devices that are accessible by the one or more emergency responders. The one or more responder devices are configured to communicate over a network to obtain an access code that unlocks the locking mechanism of the secure container. The system further includes a dispatcher device having access to a data structure with stored authorization information for the one or more emergency responders. The dispatcher device is configured to determine whether an emergency responder, of the one or more emergency responders, has authorization to open the secure container. Authorization is determined based on whether authorization information received from a responder device of the emergency responder matches corresponding stored authorization information. The dispatcher device is further configured to provide, via the network, the access code to the responder device of the emergency responder, the access code permitting the emergency responder to unlock the secure container to obtain the access information for the secure site.

In an embodiment of the invention, the secure container is further defined as being located on one of: an exterior wall of the secure site, a building separate from the secure site that is part of a campus of buildings with the secure site, or an exterior wall around the campus of buildings.

In another embodiment of the invention, an exterior of the secure container includes one or more indicia uniquely identifying the secure container. In this embodiment, the dispatcher device is further configured to receive indicia information identifying the one or more indicia of the secure container, and use the indicia information to identify the secure container.

In another embodiment of the invention, the dispatcher device is in secure location that is the only location from which the dispatcher device is permitted to transmit the access code to the one or more responder devices.

In another embodiment of the invention, the secure container is a mechanical device.

In another embodiment of the invention, the secure container is an electronic device.

In another embodiment of the invention, the access information includes at least one of: a means for entering a point of entry of the secure site, and schematic information for the secure site and/or a campus of buildings that includes the secure site. In another embodiment of the invention, the means for entering the point of entry includes one of a physical key to a door of the secure site, an electronic key to the door of the secure site, or a passcode to the door of the secure site.

In another embodiment of the invention, the secure site is at least one of: a school, a stadium, a concert venue, a powerplant, or a laboratory.

In another embodiment of the invention, the dispatcher device, when performing actions relating to data processing and/or data transmission, is triggered to perform said actions by at least one of user input from a dispatcher, or an automated authorization system.

In another embodiment of the invention, the dispatcher device is further configured to determine that an access code reset condition has been satisfied, and change the access code for the secure container.

In another embodiment of the invention, the secure container is a first secure container, the emergency responder is a first emergency responder, and the access code is a first access code. In this embodiment, the system further includes a second secure container with a locking mechanism for storing access information for another secure site. In this embodiment, the dispatcher device is further configured to determine whether a second emergency responder, of the one or more emergency responders, has authorization to open the second secure container. Authorization is determined based on whether authorization information received from a responder device of the second emergency responder matches corresponding stored authorization information. The dispatcher device is further configured to provide, via the network, data identifying the second access code to the responder device of the second emergency responder, the second access code permitting the second emergency responder to unlock the second secure container to obtain the access information for the other secure site.

In another embodiment of the invention, the secure container is a first secure container, the access information stored within the first secure container is for a first point of entry of the secure site, and an exterior of the first secure container includes a first indicium uniquely identifying the first secure container. In this embodiment, the system further includes a second secure container for storing access information for a second point of entry of the secure site, where an exterior of the second secure container includes a second indicium uniquely identifying the second secure container. In this embodiment, the dispatcher device is further configured to receive indicia information identifying the first indicium of the first secure container, receive indicia information identifying the second indicium of the second secure container, and use at least one of the indicia information for the first indicium and the indicia information for the second indicium to identify the access code being requested.

In another aspect of the invention, a method for providing an emergency responder with access to a secure site is disclosed. The method includes providing, by a responder device of the emergency responder and to a dispatcher device, a request for an access code to a secure container. The secure container is located in an unsecured place at or near the secure site and has a locking mechanism for storing access information for the secure site. Providing the request to the dispatcher device causes the dispatcher device to determine whether to authorize the emergency responder. In response to the dispatcher device determining that the emergency responder has authorization to open the secure container, the method further includes receiving the access code from the dispatcher device. The method further includes opening the secure container with the access code. The method further includes using the access information stored within the secure container to access a point of entry of the secure site.

In another aspect of the invention, a method for providing one or more emergency responders with access to a secure site is disclosed. The method includes receiving, by a dispatcher device, a request for an access code to a secure container. The secure container is located in an unsecured place at or near the secure site and has a locking mechanism for storing access information for the secure site. The request is received from a responder device of an emergency responder that is one of the one or more emergency responders. The method further includes determining, by the dispatcher device, whether the emergency responder has authorization to open the secure container based on authorization information included in the request. In response to the dispatcher device determining that the emergency responder has authorization to open the secure container, the method further includes providing the access code to the responder device, the access code to permit the emergency responder to use the access code to unlock the secure container.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

FIG. 7 is a flowchart of an example process for providing an emergency responder with access to a secure container that includes access information for the secure site.

DETAILED DESCRIPTION

Figure 1:
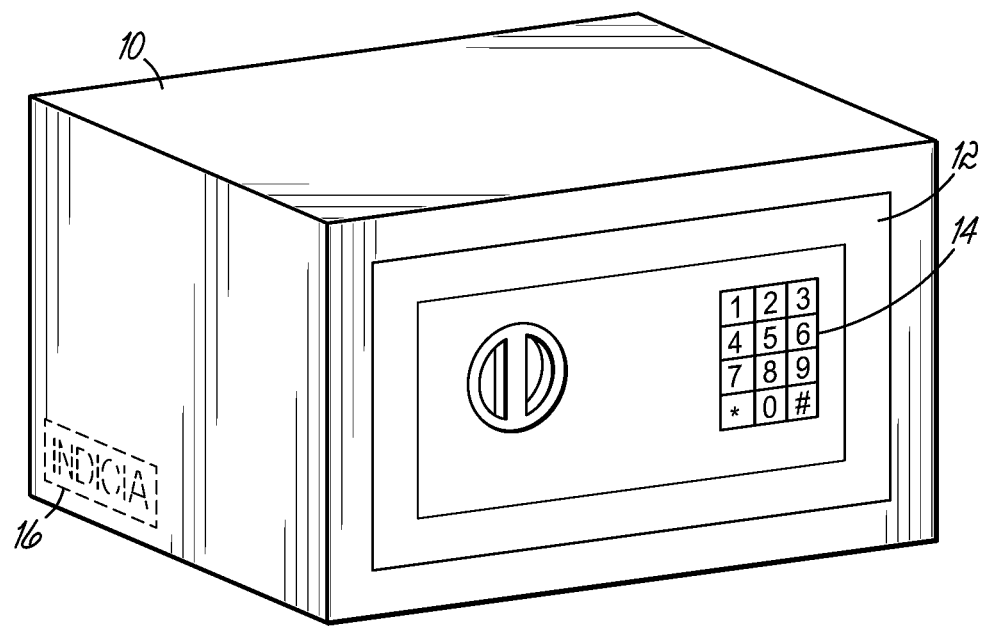
FIG. 1 is a perspective view of a secure container in a locked position.

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Figure 2:
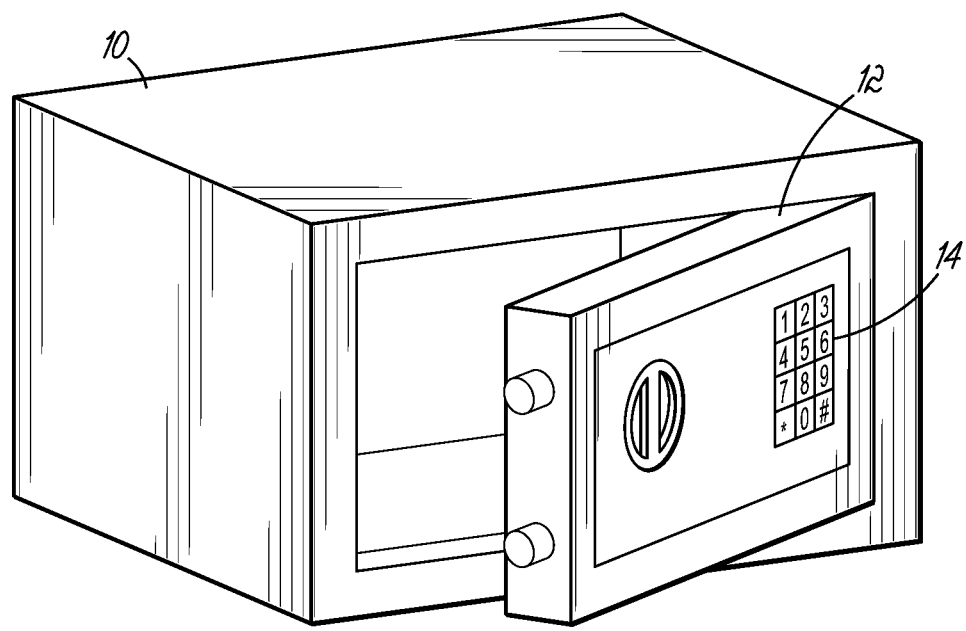
FIG. 2 is a perspective view of the secure container in an unlocked position.

FIGS. 1 and 2 illustrate perspective views of a secure container 10. For example, FIG. 1 is a perspective view of the secure container 10 in a locked position and FIG. 2 is a perspective view of the secure container 10 in an unlocked position.

The secure container 10 may be a safe, a storage container, and/or any other container or object capable of being made tamper resistant. The secure container 10 may include an access door 12 that may be locked or unlocked using a locking mechanism 14. The access door 12 may be made of reinforced steel or a similar material or composite material. The access door 12 may be hinged or removable.

In some embodiments, the locking mechanism 14 may be mechanical. For example, the locking mechanism 14 may include a combination dial lock and/or a similar type of mechanical lock. A mechanical combination lock involves one or more rotating dials with numbers, letters, or characters and requires a user to input a specific sequence of these characters (referred to herein as an access code) to unlock the access door 12.

In some embodiments, the locking mechanism 14 may be electronic. For example, the locking mechanism 14 may include a keypad lock, a biometric lock, a radio frequency identification (RFID) lock, a Bluetooth-based lock, an electronic combination lock, and/or another type of electronic lock. A keypad lock, such as that shown in FIGS. 1 and 2, uses a digital keypad where a user has to input an access code to unlock the access door 12. A biometric lock utilizes fingerprint scanners or similar biometric data to unlock the access door 12. An RFID lock utilizes tags that can be placed near the access door 12 to cause the access door 12 to unlock. A Bluetooth-based lock utilizes Bluetooth or wireless connectivity to unlock the access door 12.

The locking mechanism 14 may be locked or unlocked using an access code delivered to an authorized user (e.g., an emergency responder) at the secure site. In one embodiment, the access code may be a four or a six digit code that is provided to an emergency responder. The access code may be provided from a dispatcher device located in an emergency communication dispatch center and can be provided in a human-initiated or an automated manner.

In some embodiments, the secure container 10 may include indicium 16 capable of uniquely identifying the secure container 10. For example, if a secure site has multiple points of entry, multiple secure containers 10 may be located in the vicinity of each respective point of entry. In this case, each respective secure container 10 may include indicium 16 capable of uniquely identifying the secure container 10. The indicium 16 may include a distinctive color, a distinctive symbol, a distinctive shape, a distinctive tagging or marking, or the like, so that the secure container 10 is readily identifiable to emergency responders. To provide a few specific examples, the indicium may be a bar code, a quick response (QR) code, a serial number, or the like, for making the secure container 10 readily identifiable to emergency responders. Indicium 16 may, for example, be provided on an exterior of the secure container 10 such that the indicium 16 is readily identifiable when an emergency responder arrives during an incident. In some embodiments, multiple indicia 16 may be visible on the secure container 10.

The secure container 10 may be sized to store access information relating to a secure site. The access information may include a means for entering a point of entry of the secure site and/or schematic information for the secure site and/or a campus of buildings that includes the secure site. The means for entering the point of entry may include a physical key to a door of the secure site, an electronic key to the door of the secure site, a passcode to the door of the secure site, and/or another type of access key. The schematic information may include floor plan information, site map information, communication system information and/or site camera feed information, information identifying a location of dangerous materials within the secure site, and/or the like. In a preferred embodiment, the secure container 10 may be roughly seven inches wide by nine inches tall and six inches deep.

Additionally, or alternatively, the secure container 10 may further include anchors, a reflective logo, a drawstring bag, a doorstop and/or a wedge, a key ring, a tag, packaging including an instructions card describing installation and inner/master cartons, internal packaging, such as polybags, and/or the like. Additionally, or alternatively, the secure container 10 may include one or more lock boxes. For example, in some situations, a lock box may be placed within the secure container 10. In this way, different contents of the secure container 10 may be made available to different users, depending on the authorization levels of the user. Specifically, the lock box may be used to store items that are only accessible to users with a certain level of authorization. For example, a first level of access may be needed to open the secure container 10, which may provide access to a point of entry of the secure site. However, other items may be placed into the lock box, such that only a subset of the authorized personnel are able to access the contents of the lock box.

Figure 3:
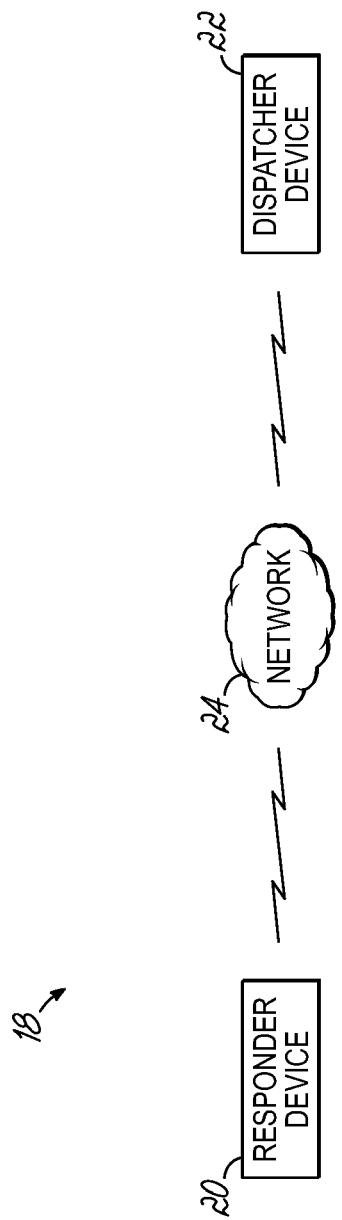
FIG. 3 is a diagram of an example environment in which systems and/or methods described herein may be implemented.

FIG. 3 is a diagram of an example environment 18 in which systems and/or methods described herein may be implemented. As shown in FIG. 3, environment 18 may include a responder device 20, a dispatcher device 22, and/or a network 24. Devices of environment 18 may interconnect via wired connections, wireless connections, or a combination of wired and wireless connections.

Responder device 20 includes one or more devices capable of receiving, generating, storing, processing, and/or providing information associated with accessing the secure container 10. For example, responder device 20 may include a mobile phone (e.g., a smart phone, a radiotelephone, etc.), an in-vehicle computer, a laptop computer, a tablet computer, a handheld computer, a server computer, a wearable communication device (e.g., a smart wristwatch, a pair of smart eyeglasses, etc.), or a similar type of device. In some embodiments, the responder device 20 may provide a request for an access code to a secure container to the dispatcher device 22. The request may, for example, include authorization information for an emergency responder and/or indicia information capable of uniquely identifying the secure container.

In some embodiments, an emergency responder may interact with the responder device 20 to place a call to the dispatcher device 22. During the call, the emergency responder may request the access code to the secure container 10 and/or may provide any authorization information needed to obtain the access code. In some embodiments, an application may be installed on the responder device 20 to facilitate one or more of the methods and/or functions described herein. For example, an emergency access management application may facilitate requesting an access code for the secure container 10, may facilitate the authorization process, and/or may facilitate providing an emergency responder with the access code.

Dispatcher device 22 includes one or more devices capable of receiving, generating, storing, processing, and/or providing information associated with accessing the secure container 10. For example, dispatcher device 22 may include a desktop computer, a laptop computer, a tablet computer, a handheld computer, a server computer, a wearable communication device, or a similar type of device.

In some embodiments, the dispatcher device 22 may have access to one or more data structures used to associate one or more types of information described herein. For example, the dispatcher device 22 may have access to a data structure that stores data identifying access codes for various secure containers 10. The data identifying the access codes may be stored in association with site information that identifies a secure site, location information that identifies a location of the secure site and/or a location of the secure container 10, indicia information that uniquely identifies the secure container 10, and/or the like. Additionally, or alternatively, the dispatcher device may have access to a data structure that stores authorization information of emergency responders. The authorization information for the emergency responders may be stored in a separate data structure or may be stored in the same data structure in association with the access codes, the site information, the location information, and/or the indicia information.

In some embodiments, the dispatcher device 22 may authorize an emergency responder. For example, the dispatcher device 22 may receive, from the responder device 20, a request for an access code to the secure container 10. The request may include authorization information for the emergency responder. The dispatcher device 22 may have access to a data structure that stores authorization information for emergency responders. The dispatcher device 22 may reference the data structure to determine whether the authorization information provided in the request matches corresponding stored authorization information. If the authorization information included in the request matches corresponding stored authorization information, the authorization may succeed. If the authorization information included in the request does not match corresponding stored authorization information, then the authorization may fail. If the authorization was successful, a response with the access code for the secure container 10 may be made available to the emergency responder. If the authorization was unsuccessful, the response provided may indicate that proper authorization has not been provided.

In some embodiments, the dispatcher device 22 may be operated by a human dispatcher. For example, a dispatcher may receive, from an emergency responder, a call requesting an access code for the secure container 10. In this case, the dispatcher may interact with the dispatcher device 22 to authorize the emergency responder, to identify the access code, and to provide the access code to the emergency responder.

In some embodiments, the dispatcher device 22 may be controlled by an emergency access management application. The application may permit data communications between the dispatcher device 22 and the responder device 20. In some embodiments, one or more functions performed by the dispatcher device 22 may be controlled using automation processes. For example, the dispatcher device 22 may be configured to receive a request from a responder device 20, to automatically determine whether to authorize the request, and to provide the responder device 20 with either the access information for the secure container 10 or a message indicating that the authorization was unsuccessful.

In some embodiments, the dispatcher device 22 may perform authorization using an automated authorization system. For example, the dispatcher device 22 may utilize (or have access to) an automated authorization system that uses one or more automation techniques, one or more natural language processing techniques, and/or one or more machine learning techniques to automatically determine whether to authorize an emergency responder.

To provide a specific example, the automated authorization system may receive a request for an access code. In this example, the automated authorization system may use one or more natural language processing techniques to identify authorization information included in the request. The identified authorization information may be a string of text, voice data that is analyzed to identify the authorization information verbalized in a message given by an emergency responder, and/or image data identifying the authorization information. Next, the automated authorization system may be configured to compare the identified authorization information against a data structure of stored authorization information for one or more groups of emergency responders. If the identified authorization information matches corresponding stored authorization information, the automated authorization system may be configured to transmit the access code to the responder device 20.

In some embodiments, the dispatcher device 22 may include a phone, headset, and computer. In some embodiments, the phone and headset may be separate from the dispatcher device 22. In this case, the dispatcher may receive a call via the headset and phone, and then may use the dispatcher device 22 to authorize the emergency responder and look up the appropriate access code to the secure container 10. In some embodiments, the dispatcher device 22 may include one or more servers that use cloud computing to manage access requests for a large geographic region. For example, a lead dispatcher device 22 may facilitate the distribution of calls and/or data between a group of responder devices 20 and a group of secondary dispatcher devices 22. In this case, the lead dispatcher device 22 may receive a call or request for an access code from a responder device 20 and may use a priority queue to identify which second dispatcher device 22 to connect with the responder device 20.

In some embodiments, the dispatcher device 22 may be located in an emergency communication dispatch center. In some embodiments, the emergency communication dispatch center may be the only location from which the dispatcher device 22 is permitted to provide an access code to a responder device 20. That is to say, the emergency communication dispatch center may be a secure, single-access location, ensuring that stored access codes are not intercepted by unauthorized users. The emergency communication dispatch center may be secured in a number of different ways. For example, the center may be physically secured by requiring credential information and/or authorization information for entry. To provide another example, the center may be physically secured using armed guards. In another example, the center may be secured from a data protection and/or privacy standpoint using one or more firewalls.

Network 24 includes one or more wired and/or wireless networks. For example, network 24 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 18 may perform one or more functions described as being performed by another set of devices of environment 18.

Figure 4:
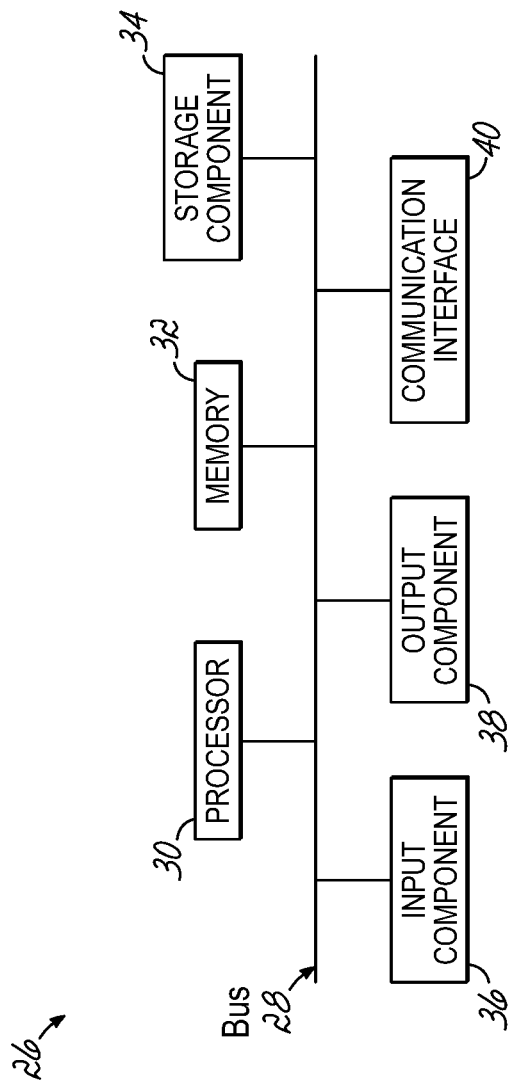
FIG. 4 is a diagram of example components of one or more devices of FIG. 3.

FIG. 4 is a diagram of example components of a device 26. Device 26 may correspond to the responder device 20 and/or the dispatcher device 22. In some embodiments, the responder device 20 and/or the dispatcher device 22 may include one or more devices 26 and/or one or more components of device 26. As shown in FIG. 4, device 26 may include a bus 28, a processor 30, a memory 32, a storage component 34, an input component 36, an output component 38, and/or a communication interface 40.

Bus 28 includes a component that permits communication among multiple components of device 26. Processor 30 is implemented in hardware, firmware, and/or a combination of hardware and software. Processor 30 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some embodiments, processor 30 includes one or more processors capable of being programmed to perform a function. Memory 32 includes a random-access memory (RAM), a read only memory (ROM), and/or another type of dynamic or static storage device (e.g., a flash memory, a magnetic memory, and/or an optical memory) that stores information and/or instructions for use by processor 30.

Storage component 34 stores information and/or software related to the operation and use of device 26. For example, storage component 34 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 36 includes a component that permits device 26 to receive information, such as via user input (e.g., a touch screen display, a keyboard, a keypad, a mouse, a button, a switch, and/or a microphone). Additionally, or alternatively, input component 36 may include a sensor for sensing information (e.g., a global positioning system (GPS) component, an accelerometer, a gyroscope, and/or an actuator). Output component 38 includes a component that provides output information from device 26 (e.g., a display, a speaker, and/or one or more light-emitting diodes (LEDs)).

Communication interface 40 includes a transceiver-like component (e.g., a transceiver and/or a separate receiver and transmitter) that enables device 26 to communicate with other devices, such as via a wired connection, a wireless connection, or a combination of wired and wireless connections. Communication interface 40 may permit device 26 to receive information from another device and/or provide information to another device. For example, communication interface 40 may include an Ethernet interface, an optical interface, a coaxial interface, an infrared interface, a radio frequency (RF) interface, a universal serial bus (USB) interface, a Wi-Fi interface, a cellular network interface, or the like.

Device 26 may perform one or more processes described herein. Device 26 may perform these processes based on processor 30 executing software instructions stored by a non-transitory computer-readable medium, such as memory 32 and/or storage component 34. A computer-readable medium is defined herein as a non-transitory memory device. A memory device includes memory space within a single physical storage device or memory space spread across multiple physical storage devices.

Software instructions may be read into memory 32 and/or storage component 34 from another computer-readable medium or from another device via communication interface 40. When executed, software instructions stored in memory 32 and/or storage component 34 may cause processor 30 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 4 are provided as an example. In practice, device 26 may include additional components, fewer components, different components, or differently arranged components than those shown in FIG. 4. Additionally, or alternatively, a set of components (e.g., one or more components) of device 26 may perform one or more functions described as being performed by another set of components of device 26.

Figure 5:
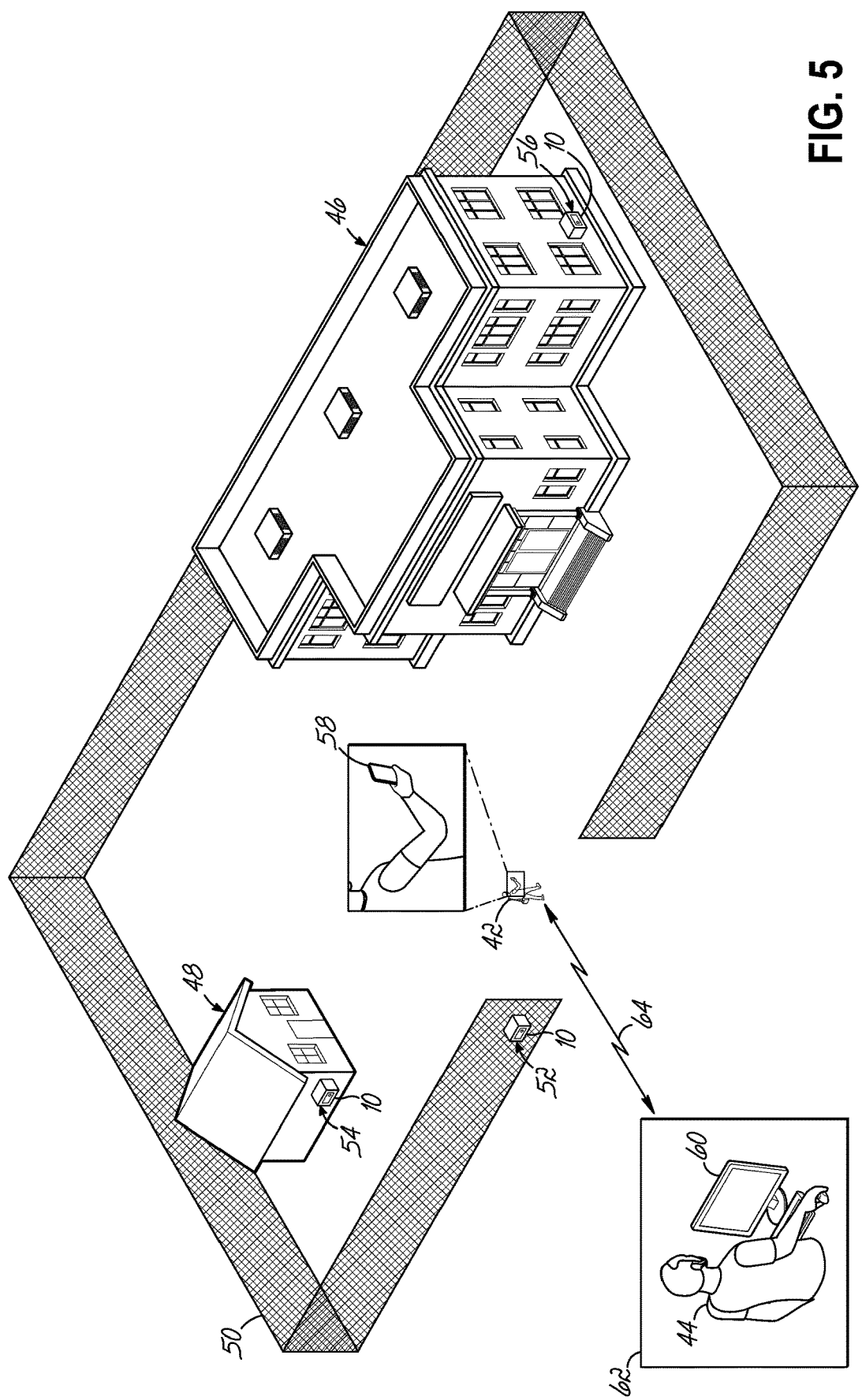
FIG. 5 is a diagram illustrating an emergency responder communicating with a remote dispatcher such that the emergency responder is provided with access to a secure container, where the secure container includes access information for a secure site.

FIG. 5 is a diagram illustrating an emergency responder 42 communicating with a remote dispatcher 44 such that the emergency responder 42 is provided with access to the secure container 10, where the secure container 10 includes access information for a secure site 46. The secure site 46 may be part of a campus of buildings that includes the secure site 46 and an outpost 48. A boundary of the campus is shown using exterior wall 50. Exterior wall 50 may be a fence or a similar type of physical barrier.

As shown in FIG. 5, the secure container 10 may be placed in any of example locations 52, 54, 56. For example, the secure container 10 may be placed in example location 52, which is shown as being on an exterior wall of the campus. To provide another example, the secure container 10 may be placed in example location 54, which may be an exterior wall of the outpost 48. To provide another example, the secure container 10 may be placed in an example location 56, which may be an exterior wall of the secure site 46.

Specific positioning of the secure container 10 may include being mounted to, or recessed within, a surface, wall, boundary, and/or another object associated with the secure site 46, outpost 48, and/or exterior wall 50. It is to be understood that these locations are provided by way of example. In practice, the specific location at which the secure container 10 is installed may be selected by consulting with law enforcement. For example, law enforcement may recommend a specific location based on ease of accessibility of the location in the event of a crisis and/or based on other factors known to law enforcement officials who have experience in responding to crisis situations and/or critical incidents.

While secure site 46 is described as being a building within a campus, it is to be appreciated that this is provided by way of example. In practice, any building, enclosure, or area that is capable of restricting access to authorized personnel may be referred to as a secure site.

As shown in FIG. 5, the emergency responder 42 has access to a responder device 58. Responder device 58 may correspond to responder device 20 described in connection with FIG. 2. Furthermore, the remote dispatcher 44 has access to a dispatcher device 60. Dispatcher device 60 may correspond to dispatcher device 22 described in connection with FIG. 2. The dispatcher 44 and dispatcher device 60 are shown as being located within an emergency communication dispatch center 62.

In some embodiments, the responder device 58 may communicate with the dispatcher device 60 via wireless communication interface 64. The emergency responder 42 may interact with a user interface of the responder device 58 to initiate a communication session with the dispatcher device 60. In a particular example, the emergency responder 42 may visit the secure site 46 to respond to a distress call and may call the dispatcher 44 to request the access code to the secure container 10. The dispatcher 44 may verify the authorization information of the emergency responder 42 and may provide the emergency responder 42 with the access code to the secure container 10.

In some embodiments, the location of the secure container 10 may be known to the emergency responder in advance of the responder arriving at the secure site 46. In some embodiments, the location of the secure container 10 may be provided to the emergency responder via the dispatcher device 60.

In some embodiments, the dispatcher device 60 may broadcast the access code publicly. For example, assume a critical situation has occurred but the danger is confirmed to be contained inside of the secure site 46. In this example, it may be advantageous from a time management perspective to automatically broadcast the access code to the responder device 58 and to any other responder devices within a threshold distance of the secure site 46. In this case, the dispatcher device 60 may determine to change the access code based on an access code reset condition being satisfied. For example, the access code reset condition may be the dispatcher device 60 receiving an indication that the incident at issue has ended, or that a threshold period of time has passed since the conclusion of the incident. This ensures that the access code is not subsequently leaked to unauthorized parties.

The purpose of the secure container 10 is to provide the emergency responder 42 with instant, secure, and complete access to the scene of the critical incident so that the emergency responder 42 can develop and implement an action plan to save the lives of anyone at risk inside the secure site 46. By utilizing the system and method(s) described herein, the emergency responder 42 is able to develop and implement the action plan without having to take the time to identify the person who has the access keys that would otherwise be needed to gain access to the secure site 46. Furthermore, utilizing the system and method(s) described herein eliminates the need for an emergency responder to have to remember the specific access code for the secure container 10. Still further, this can be done while still implementing unique access codes for each secure container located among a group of secure sites.

Figure 6:
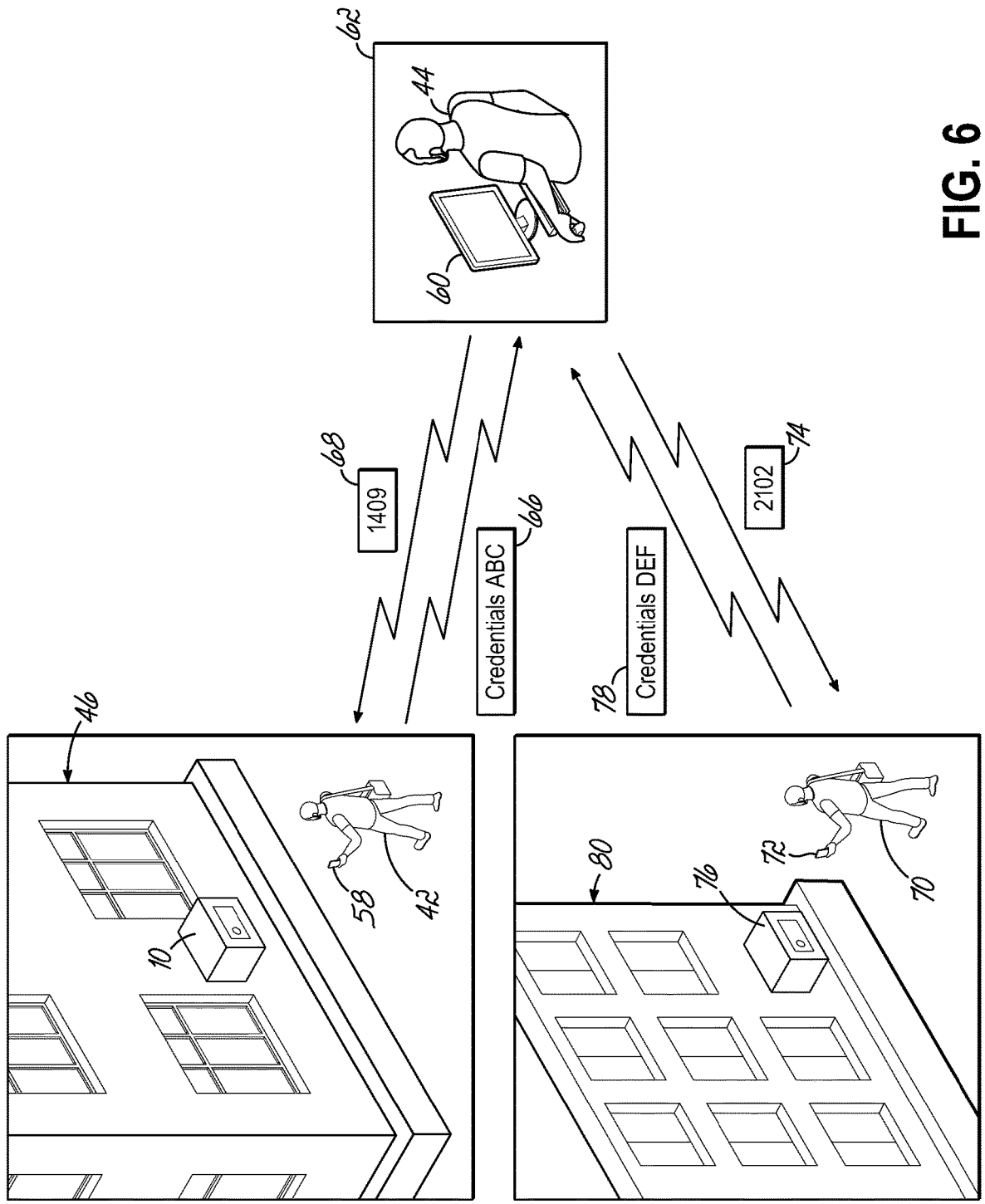
FIG. 6 is a diagram illustrating the remote dispatcher providing access codes to emergency responders located at several different secure sites.

FIG. 6 is a diagram illustrating the remote dispatcher 44 providing access codes to emergency responders located at several different secure sites. For example, and as shown by reference number 66, the emergency responder 42 may interact with the responder device 58 to request a first access code 68 for the secure container 10. The request may include credential information 66 for the emergency responder 42. Credential information 66 is shown as including credentials A-B-C. The dispatcher 44 may use the dispatcher device 60 to authorize the emergency responder 42 (in a manner described elsewhere herein). After the authorization succeeds, the dispatcher 44 may interact with the dispatcher device 60 to provide, to the responder device 58, a response that includes the first access code 68 for the secure container 10. In the example shown, the first access code 68 is the numerical digits 1-4-0-9.

To provide another example, an emergency responder 70 may interact with a responder device 72 to request a second access code 74 for a secure container 76. The request may include credential information 78 for the emergency responder 70. The credential information 78 is shown as credentials D-E-F. The dispatcher 44 may use the dispatcher device 60 to authorize the emergency responder 70 (in a manner described elsewhere herein). After the authorization succeeds, the dispatcher 44 may use the dispatcher device 60 to provide, to the responder device 72, a response that includes the second access code 74 for the secure container 76. In the example shown, the second access code 74 is the numerical digits 2-1-0-2. The secure container 76 may be located at secure site 80 which is in a different geographic location than the secure site 46.

In some embodiments, a secure site may have multiple secure containers. For example, a secure site, such as a shopping mall, may have multiple points of entry that are separated by a substantial distance. In this case, emergency responders may need to enter the secure site through any of multiple points of entry. Furthermore, assume that an incident occurs, resulting in each point of entry of the secure site (e.g., the mall) being locked. In this case, a separate secure container may be placed near each respective point of entry. Continuing with the example, a first secure container may be in the vicinity of a first point of entry and a second secure container may be in the vicinity of a second point of entry. Each respective secure container may contain indicium or indicia allowing the respective secure container to be uniquely identified. In this way, the dispatcher 44 is able to use the indicium or indicia to identify which secure container an emergency responder is requesting to access.

FIG. 7 is a flowchart of an example process 82 for providing an emergency responder with access to a secure container that includes access information for a secure site. A responder device may provide, to a dispatcher device, a request for an access code to a secure container positioned on or near an exterior of a secure site (block 84). The responder device may receive, from the dispatcher device, the access code that permits access to the secure container (block 86). An emergency responder may use the access code to open the secure container (block 88). The emergency responder may obtain access information for the secure site from the secure container (block 90).

While one or more embodiments of the present invention have been described in detail, it should be apparent that modifications and variations thereto are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention, defined by the following claim or claims.

What is claimed is:

1. A system for providing one or more emergency responders with access to a secure site, the system comprising:
   a secure container with a locking mechanism for storing access information for the secure site, the secure container located in an unsecured location at or near the secure site;
   one or more responder devices, accessible by the one or more emergency responders that are not in possession of, or do not have access to, an access code for the secure container, and configured to communicate over a network to request the access code that unlocks the locking mechanism of the secure container; and
   a dispatcher device having access to a data structure with stored authorization information for the one or more emergency responders, the dispatcher device configured to:
   determine whether an emergency responder, of the one or more emergency responders, has authorization to open the secure container, authorization being determined based on whether authorization information received from a responder device of the emergency responder matches corresponding stored authorization information, and
   provide, via the network, the access code to the responder device of the emergency responder, the access code permitting the emergency responder to unlock the secure container to obtain the access information for the secure site.

2. The system of claim 1, wherein the secure container is further defined as being located on one of:
   an exterior wall of the secure site,
   a building separate from the secure site that is part of a campus of buildings with the secure site, or
   an exterior wall around the campus of buildings.

3. The system of claim 1, wherein an exterior of the secure container includes one or more indicia uniquely identifying the secure container, and wherein the dispatcher device is further configured to:
   receive indicia information identifying the one or more indica of the secure container; and
   use the indicia information to identify the secure container.

4. The system of claim 1, wherein the dispatcher device is in secure location that is the only location from which the dispatcher device is permitted to transmit the access code to the one or more responder devices.

5. The system of claim 1, wherein the secure container is a mechanical device.

6. The system of claim 1, wherein the secure container is an electronic device.

7. The system of claim 1, wherein the access information includes at least one of:
   a means for entering a point of entry of the secure site, and
   schematic information for the secure site and/or a campus of buildings that includes the secure site.

8. The system of claim 7, wherein the means for entering the point of entry includes one of:
   a physical key to a door of the secure site,
   an electronic key to the door of the secure site, or
   a passcode to the door of the secure site.

9. The system of claim 1, wherein the secure site is at least one of:
   a school,
   a stadium,
   a concert venue,
   a powerplant, or
   a laboratory.

10. The system of claim 1, wherein the dispatcher device, when performing actions relating to data processing and/or data transmission, is triggered to perform said actions by at least one of:
    user input from a dispatcher, or
    an automated authorization system.

11. The system of claim 1, wherein the dispatcher device is further configured to:
    determine that an access code reset condition has been satisfied; and
    change the access code for the secure container.

12. The system of claim 1, wherein the secure container is a first secure container; wherein the emergency responder is a first emergency responder; wherein the access code is a first access code; and wherein the system further comprises:
    a second secure container with a locking mechanism for storing access information for another secure site; and
    wherein the dispatcher device is further configured to:
    determine whether a second emergency responder, of the one or more emergency responders, has authorization to open the second secure container, authorization being determined based on whether authorization information received from a responder device of the second emergency responder matches corresponding stored authorization information, and
    provide, via the network, data identifying the second access code to the responder device of the second emergency responder, the second access code permitting the second emergency responder to unlock the second secure container to obtain the access information for the other secure site.

13. The system of claim 1, wherein the secure container is a first secure container, wherein the access information stored within the first secure container is for a first point of entry of the secure site; wherein an exterior of the first secure container includes a first indicium uniquely identifying the first secure container; and wherein the system further comprises:
    a second secure container for storing access information for a second point of entry of the secure site, wherein an exterior of the second secure container includes a second indicium uniquely identifying the second secure container; and
    wherein the dispatcher device is further configured to:
    receive indicia information identifying the first indicium of the first secure container;
    receive indicia information identifying the second indicium of the second secure container; and
    use at least one of the indicia information for the first indicium and the indicia information for the second indicium to identify the access code being requested.

14. A method for providing an emergency responder with access to a secure site, the method comprising:
    providing, by a responder device of the emergency responder and to a dispatcher device, a request for an access code to a secure container, wherein the secure container is located in an unsecured place at or near the secure site and has a locking mechanism for storing access information for the secure site, wherein the emergency responder does not have the access code at a time at which the request is made, and wherein providing the request to the dispatcher device causes the dispatcher device to determine whether to authorize the emergency responder;

in response to the dispatcher device determining that the emergency responder has authorization to open the secure container, receiving the access code from the dispatcher device;

opening the secure container with the access code; and using the access information stored within the secure container to access a point of entry of the secure site.

15. A method for providing one or more emergency responders with access to a secure site, the method comprising:

receiving, by a dispatcher device of an emergency responder, a request for an access code to a secure container, wherein the secure container is located in an unsecured place at or near the secure site and has a locking mechanism for storing access information for the secure site, wherein the request is received from a responder device of an emergency responder, of the one or more emergency responders, and wherein the emergency responder does not have the access code at a time at which the request is made;

determining, by the dispatcher device, whether the emergency responder has authorization to open the secure container based on authorization information included in the request; and in response to the dispatcher device determining that the emergency responder has authorization to open the secure container, providing the access code to the responder device, the access code to permit the emergency responder to use the access code to unlock the secure container.

* * * * *